United States Patent [19]

Schleicher

[11] Patent Number: 4,702,124
[45] Date of Patent: Oct. 27, 1987

[54] POWER TRANSMISSION DEVICE
[75] Inventor: John K. Schleicher, Borden, Ind.
[73] Assignee: Accuratio Systems, Inc., Jeffersonville, Ind.
[21] Appl. No.: 868,717
[22] Filed: May 30, 1986
[51] Int. Cl.$^4$ ............................................. F16H 37/06
[52] U.S. Cl. ..................................... 74/675; 74/665 N
[58] Field of Search ................. 74/665 M, 665 N, 675

[56] References Cited

U.S. PATENT DOCUMENTS

| 1,519,309 | 12/1924 | Hummel | 74/675 |
| 1,563,612 | 12/1925 | Cutler et al. | 74/675 X |
| 1,660,439 | 2/1928 | Greve | 74/675 |
| 1,996,579 | 4/1935 | Johnstone et al. | 74/675 |
| 2,771,791 | 11/1956 | Bachman | 74/675 |
| 2,785,369 | 3/1957 | Ligh | 74/675 X |

FOREIGN PATENT DOCUMENTS

| 692877 | 5/1940 | Fed. Rep. of Germany | 74/675 |
| 1099160 | 10/1955 | France | 74/675 |
| 339915 | 12/1930 | United Kingdom | 74/675 |

Primary Examiner—Leslie Braun
Assistant Examiner—D. Wright
Attorney, Agent, or Firm—Jon C. Winger

[57] ABSTRACT

A gear box having two coaxial output shafts. The gear box provides for selectively turning the shafts whereby either the outer and inner output shafts rotate together in the same direction at the same angular velocity, the inner output shaft is rotated while the outer output shaft remains stationary, or the outer and inner output shafts are rotated independently of each other. The gear box includes two spaced apart coaxial spur bevel gears and a pair of spur bevel pinions each in meshing engagement with both spur bevel gears. A spur shaft is concentrically located over the inner output shaft and the spur bevel pinions are structurally attached to the spur shaft by radially axles. A first one of the spur bevel gears is concentrically located on the outer output shaft and attached thereto for rotation therewith. The second one of the spur bevel gears is concentrically located on the spur shaft and is journal mounted thereon for independent rotation. A worm wheel is formed in the periphery of each of the first and second spur bevel gears and a different worm is in meshing engagement with each worm wheel formed in the periphery of each of the first and second spur bevel gears. The two worms are independently driven by means of individually drive motors. A transfer gear arrangement interconnects the spur shaft with the inner one of the output shafts.

14 Claims, 4 Drawing Figures

POWER TRANSMISSION DEVICE

BACKGROUND OF THE INVENTION

The present invention relates to gear boxes or transmissions, and more particularly to a gear box or transmission having two coaxial output or driving shafts.

Various gear boxes or transmissions particularly adapted for manipulating tools are known. Examples are shown in U.S. Pat. No. 2,822,094 issued on Feb. 4, 1958 to E. M. Greer, U.S. Pat. No. 3,315,542 issued on Apr. 25, 1967 to A. Fortin et al, and U.S. Pat. No. 3,817,403 issued on June 18, 1974 to Charles Glachet.

It is an object of the present invention to provide a gear box which has two coaxial output shafts.

It is another object of the present invention to provide a gear box having two coaxial output shafts wherein the two output shafts are selectively either simultaneously driven in the same rotational direction at the same angular velocity, or the inner one of the output shafts is driven independently of the outer one of the output shafts and the outer shaft remains stationary, or the inner one of the output shafts and outer one of the output shafts are driven independently of each other in the same direction at different angular velocities, or the inner one of the output shafts and outer one of the output shafts are driven independently of each other in opposite directions at the same angular velocities, or the inner one of the output shafts and outer one of the output shafts are driven independently of each other in opposite directions at different angular velocities.

It is a further object of the present invention to provide a gear box of the class described which is compact in size.

BRIEF DESCRIPTION OF THE DRAWING

The present invention will become even more clear upon reference to the following drawings wherein like numerals refer to like parts throughout and in which.

DETAILED DESCRIPTION OF THE PREFERRED EMBODIMENT

Figure 1:
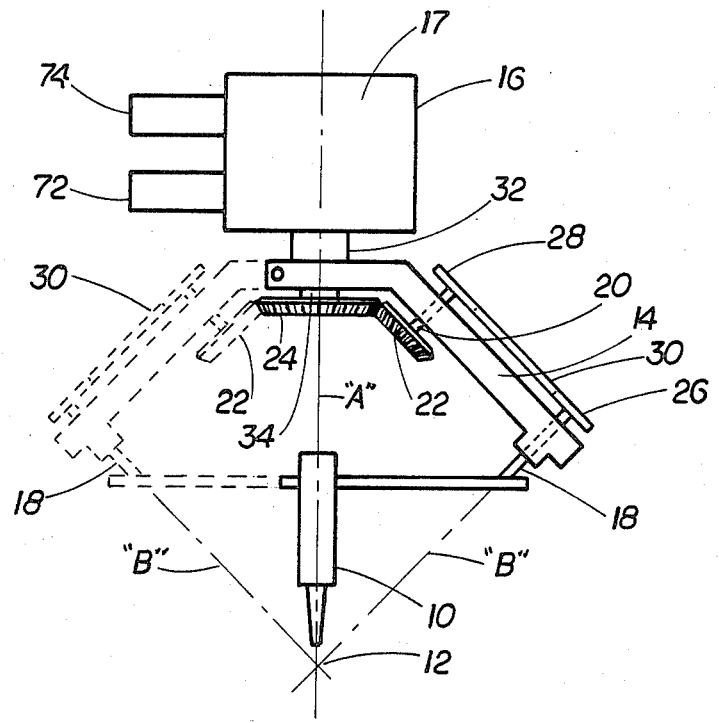
FIG. 1 is a schematic representation of the gear box of the present invention illustrating it driving a tool for rotating the tool in a horizontal plane about a fixed focal point.
Figure 2:
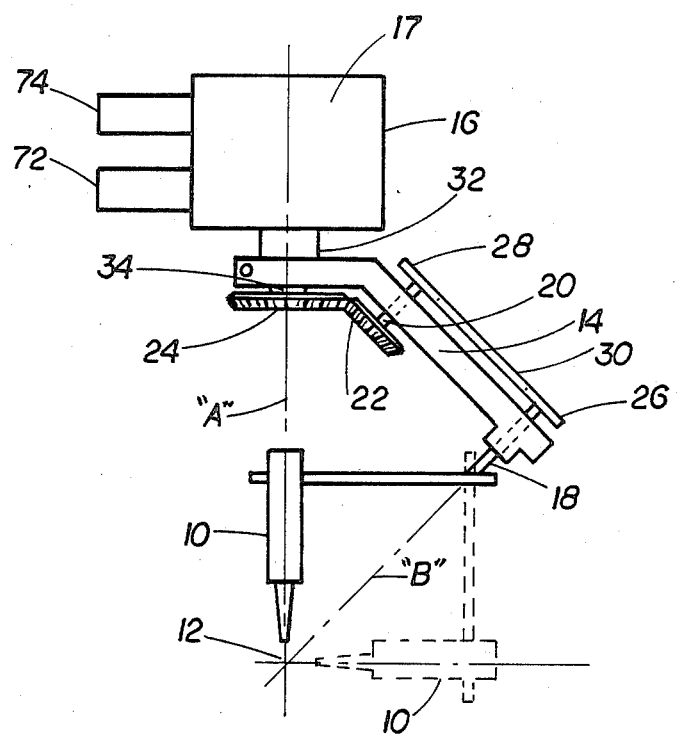
FIG. 2 is a schematic representation of the gear box of the present invention illustrating it driving a tool for tilting the tool in a vertical plane about a fixed focal point.

First, with reference to FIGS. 1 and 2, there is shown a tool 10 which is to be manipulated about a focal point 12 corresponding to a predetermined location on a workpiece (not shown). The tool 10 can be, for example, a glue dispensing nozzle, a water jet nozzle, a welding or cutting gun or laser cullminator. The tool 10 does not form part of the invention, and, therefore, it will not be discussed in further detail.

The tool 10 is attached to the distal end of a support arm 14. The proximal end of the support arm 14 is attached to the output of the gear box 16 of the invention as will hereafter be described. The support arm 14 includes a tool driving shaft 18 which is journal mounted in the support arm 14 near the distal end of the support arm 14. The tool 10 is attached to one end of the tool driving shaft 18 for rotation therewith. The support arm 14 further includes a driven shaft 20 journal mounted in the support arm 14 near the proximal end of the support arm 14. The axis of rotation of the driven shaft 20 and tool driving shaft 18 are parallel. A driven gear 22, shown as a bevel gear, is attached to one end of the driven shaft 20. The driven gear 22 is in mesh with a driving gear 24, shown as a bevel gear, which driving gear 24 is rotated by the gear box 16 as will hereinafter be described. The driven shaft 20 is operatively connected to the tool driving shaft 18. As shown, this operative connection includes a driving pulley 26 attached to the tool driving shaft 18 and a driven pulley 28 attached to the driven shaft 20. A drive belt 30 is trained about the driving pulley 26 and driven pulley 28 so that the tool driving shaft 18, and therefore the tool 10, are rotated upon rotation of the driven gear 24 by the gear box 16. It should be understood that the driving pulley 26 and driven pulley 28 could be replaced by gears, and that the drive belt 30 could be replaced by a drive chain.

As the gear box 16 is operated, the tool 10 can be selectively moved about an "A" axis only, or about an "B" axis only, or about both the "A" axis and "B" axis simultaneously.

Figure 3:
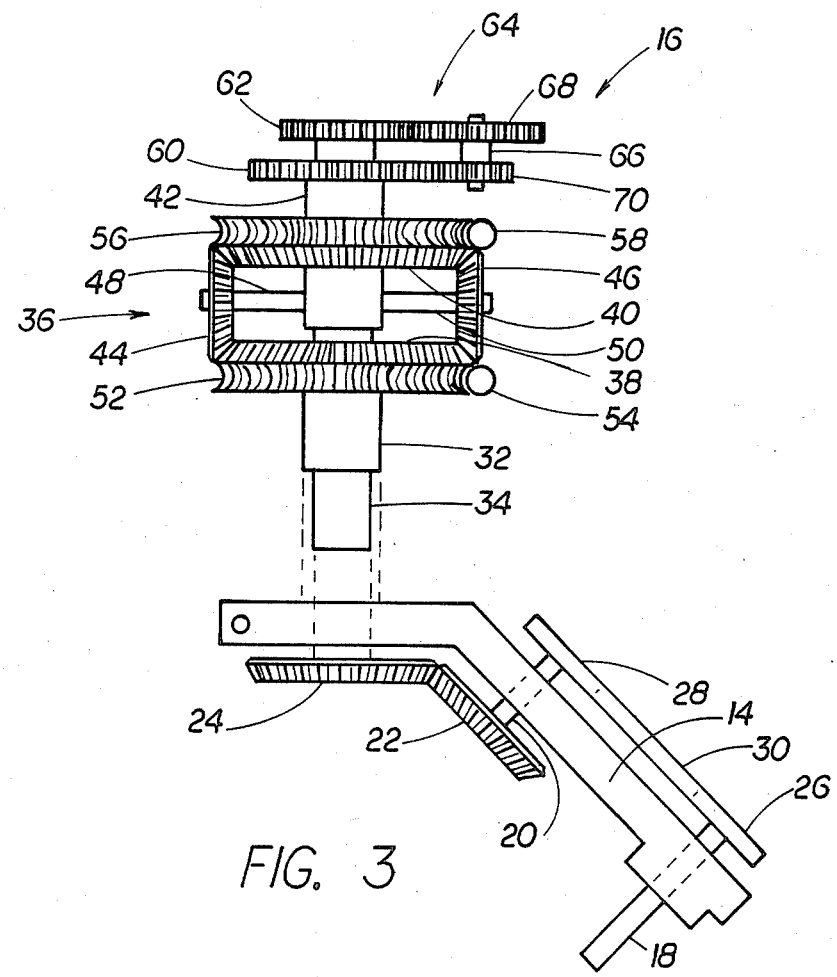
FIG. 3 is an enlarged schematic side view of the gear train of the gear box of the present invention.
Figure 4:
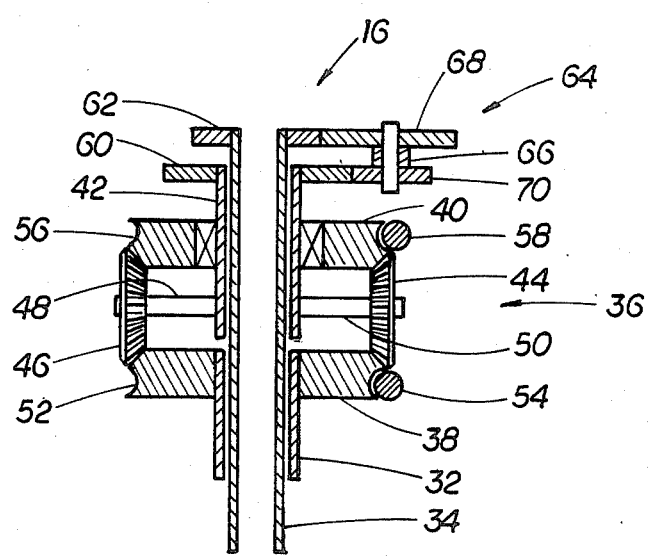
FIG. 4 is an enlarged cross-sectioned view of the gear train of FIG. 3.

FIGS. 3 and 4 show the details of the gear box 16 of the invention. The gear box 16 has a housing 17. The gear box 16 comprises a first or "A" axis (tool rotate axis) output shaft 32 which is hollow, and a second or "B" axis (tool tilt axis) output shaft 34 which is fitted coaxially within the "A" axis output shaft. One end of the "A" axis output shaft 32 and one end of the "B" axis output shaft 34 protrude from the gear box housing 17. In addition, as shown, the protruding end of the "B" axis output shaft 34 extends beyond the protruding end of the "A" axis output shaft 32. The inside diameter of the hollow interior of the "A" axis output shaft 32 and outside diameter of the "B" axis output shaft 34 are appropriately sized with sufficient clearance therebetween so that the "A" axis output shaft 32 and "B" axis output shaft 34 can be selectively rotated about the coaxis of the output shafts independently of each other. Suitable bearings (not shown) are included between the "A" axis output shaft 32 and "B" axis output shaft 34. The gear box 16 further includes a differential gear arrangement, generally denoted as the numeral 36. The differential gear arrangement 36 comprises a first spur bevel gear 38 concentrically located with and affixed to the "A" axis output shaft 32 for rotation therewith and a second spur bevel gear 40 coaxially located with the first spur bevel gear 38 but spaced therefrom. A spur shaft 42 is concentrically located over a portion of the length of the "B" axis output shaft 34 above the first spur gear 38. The spur shaft 42 has a hollow interior which receives the "B" axis output shaft 34. The inside diameter of the spur shaft 42 and outside diameter of the "B" axis output shaft 34 are appropriately sized with sufficient clearance therebetween so that the "B" axis output shaft 34 and spur shaft 42 can be rotated about the coaxis of these shafts independently of each other. The second spur gear 40 is concentrically located with the spur shaft 42 and is journal mounted thereto for independent rotation. A pair of spur bevel pinions 44 and 46 located in the space between the first spur bevel gear 38 and second spur bevel gear 40 are attached to the spur shaft 42, and are each in meshing engagement with the first spur bevel gear 38 and second spur bevel gear 40. The spur bevel pinions 44 and 46 are structurally connected to the spur shaft 42. Toward this objective, a pair of axles 48 and 50 extend radially from the spur shaft 42 in opposite directions. The first spur bevel pinion 44 is mounted to axle 48 for rotation thereon, and the second spur bevel pinion 46 is mounted to the other axle 50 for rotation thereon. Means for selectively rotating the first spur bevel gear 38 and the second spur bevel gear 40 includes two worm wheels and two worms. A first or "A" axis worm wheel 52 is formed in the periphery of the first spur bevel gear 38. A first or "A" axis worm 54 is located perpendicular to the axis of rotation of the "A" axis worm wheel 52 and, therefore, also to perpendicular to the axis of rotation of the first spur bevel gear 38. The first worm 54 is in meshing engagement with the "A" axis worm wheel 52. A second or "B" axis worm wheel 56 is formed in the periphery of the second spur bevel gear 40. A second or "B" axis worm 58 is located perpendicular to the axis of rotation of the "B" axis worm wheel 56 and, therefore, also to the axis of rotation of the second spur bevel gear 40. The second worm 58 is in meshing engagement with the "B" axis worm wheel 56. Transfer means drivingly interconnect the spur shaft 42 and the "B" axis output shaft 34. The transfer means includes a spur shaft driven gear 60 coaxially disposed with the spur shaft 42 above the differential gear arrangement 36, and affixed to the spur shaft 42 for rotation therewith, and a "B" axis drive gear 62 coaxially disposed with the "B" axis output shaft 34 above the spur shaft driven gear 60 and affixed to the "B" axis output shaft 34 for rotation therewith. Thus, the spur shaft driven gear 60 and "B" axis drive gear 62 are coaxial. The transfer means also encludes a transfer gear train, generally denoted as the numeral 64, located next to the spur shaft driven gear 60 and the "B" axis drive gear 62 interconnecting the spur shaft driven gear 60 and "B" axis drive gear 62. The transfer gear train 64 includes a transfer shaft 66 in parallel, spaced apart disposition to the coaxis of the spur shaft 42 and "B" axis output shaft 34. The transfer shaft 66 is journal mounted for free rotation. A "B" axis gear ratio step-up gear 68 is concentrically mounted on the transfer shaft 66 for rotation therewith, and is in meshing engagement with the "B" axis drive gear 62 on the "B" axis output shaft 34. An idler gear 70 is also concentrically mounted on the transfer shaft 66 for rotation therewith, and is in meshing engagement with the spur shaft driven gear 60 on the spur shaft shaft 42.

An "A" axis output shaft drive motor 72 is operatively attached to the "A" axis worm 54 for selectively driving the "A" axis worm 54 about its longitudinal axis. Similarly, a "B" axis output shaft drive motor 74 is operatively attached to the "B" axis worm 58 for selectively driving the "B" axis worm 58 about its longitudinal axis.

Now with reference to FIGS. 1, 2 and 3, the proximal end of the support arm 14 is attached to the depending end of the "A" axis output shaft 32 for movement with the "A" axis output shaft 32, and the driving gear 24 is attached to the depending end of the "B" axis output shaft 34.

In operation, with reference to FIGS. 1, 3 and 4, if it is selected to only move the tool 10 about the "A" axis, the "A" axis motor 72 is activated, thus, rotating the "A" axis worm 54 about its longitudinal axis. Due to the meshing engagement of the "A" axis worm gear 54 and "A" axis worm wheel 52, the first spur bevel gear 38 is caused to rotate about the coaxis of the "A" axis output shaft 32 and "B" axis output shaft 34. Because the first spur bevel gear 38 is affixed to the "A" axis output shaft 32, the "A" axis output shaft 32 is caused to rotate with the first spur bevel gear 38, thus, causing the support arm 14 to rotate about the "A" axis and moving the tool 10 with it about the "A" axis. The spur bevel pinions 44 and 46 rotate with the first spur bevel gear 38 which causes the spur shaft 42 to also rotate about the coaxes of the "A" axis output shaft 32 and "B" axis output 34 in the same direction as the "A" axis output shaft 32. The rotational motion of the spur shaft 42 is imparted to the "B" axis output shaft 34 through the transfer gear system 64 so that the "B" axis output shaft 34 rotates in the same direction and angular velocity as does the "A" axis output shaft 32.

With reference to FIGS. 2, 3 and 4, if it is selected to only move the tool 10 about the "B" axis, the "B" axis motor 74 is activated, thus, rotating the "B" axis worm 58 about its longitudinal axis. Due to the meshing engagement of the "B" axis worm 58 and "B" axis worm wheel 56, the second spur bevel gear 40 is caused to rotate about the coaxis of the spur shaft 42 and "B" axis output shaft 34. Because the second spur bevel gear 40 rotates about and independently of the spur shaft 42, and due to the meshing engagement of the second spur bevel gear 40 with the spur bevel pinions 44 and 46, the spur shaft 42 is caused to rotate about the coaxial "B" axis output shaft 34. The rotation of the spur shaft 42 in turn causes the spur shaft driven gear 60 affixed to the spur shaft 42 to also rotate. The spur shaft driven gear 60 meshing with the idler gear 70 on the transfer shaft 66 causes the transfer shaft 66 to rotate. The "B" axis gear ratio step-up gear 68 affixed to the transfer shaft 66 meshing with the "B" axis drive gear 62 on the "B" axis output shaft 34 causes the "B" axis output shaft 34 to rotate, thus, driving the driving gear 24 attached to the protruding end of the "B" axis output shaft 34. In turn, the driving gear 24 being in mesh with the driven gear 22, causes the driving shaft 18 in the support arm 14 to rotate about the "B" axis and moving the tool 10 with it about the "B" axis. Because of the meshing engagement of the "A" axis worm wheel 52 of the first spur bevel gear 38 with the "A" axis worm 54, the "A" axis shaft 32 remains stationary.

If it is selected to simultaneously rotate the tool 10 about both the "A" axis and "B" axis, both the "A" axis drive motor 72 and the "B" axis drive motor 74 are activated at the same time. In this event, the operation described above in regard to the movement of the tool 10 individually about the "A" axis and the "B" axis occurs simultaneously.

It should be noted that the spur bevel pinions 44 and 46 will be driven at one-half the angular velocity of the first spur bevel gear 38 or the second spur bevel gear 40. The "B" axis step-up gear 68 on the transfer shaft 64 is sized to provide a 2:1 step-up ratio so that the "B" axis output shaft 34 will rotate at the same angular velocity as the "A" axis output shaft 32.

Virtually any ratio between the input of the "A" axis worm 54 and the "A" axis shaft 32, and between the input of the "B" axis worm 58 and the "B" axis output shaft 34 can be selected. One preferred input to output ratio is 19:1 as determined by the worm to worm wheel ratio.

It should clearly be understood that while the gear box 16 has been discussed in regard to manipulating a specific tool 10, that the gear box 16 of the present invention is not limited to manipulating a specific tool.

In deed, the gear box 16 of the present invention is not limited to any particular end use.

The foregoing detailed description is given primarily for clearness of understanding and no unnecessary limitations are to be understood therefrom for modifications will become obvious to those skilled in the art upon reading this disclosure and may be made without departing from the scope of the invention or scope of the appended claims.

What is claimed is:

1. A power transmission device comprising:
   a first output shaft;
   a second output shaft coaxial with the first output shaft;
   a first spur bevel gear concentrically located with the first output shaft and affixed to the first output shaft for rotation therewith;
   a spur shaft concentrically located over the second output shaft and journal mounted thereto for independent rotation;
   a second spur bevel gear coaxially located with and spaced from the first spur bevel gear, the second spur bevel gear also being concentrically located with the spur shaft and journal mounted thereon for rotation independently of the spur shaft;
   at least one spur bevel pinion located in the space between the first and second spur bevel gears and in meshing engagement with both the first and second spur bevel gear;
   means structually connecting the at laest one spur bevel pinion to the spur shaft;
   means for selectively rotating the first spur bevel gear and the second spur bevel gear, and,
   transfer means for drivingly interconnecting the spur shaft and the second output shaft.

2. A power transmission device comprising:
   a first output shaft;
   a second output shaft coaxial with the first output shaft;
   a first spur bevel gear concentrically located with the first output shaft and affixed to the first output shaft for rotation therewith;
   a spur shaft concentrically located over the second output shaft and journal mounted thereto for independent rotation;
   a second spur bevel gear coaxially located with and spaced from the first spur bevel gear, the second spur bevel gear also being concentrically located with the spur shaft and journal mounted for rotation independently of the spur shaft;
   at least one spur bevel pinion located in the space between the first and second spur bevel gears and in meshing engagement with both the first and second spur bevel gears;
   means structually connecting the at least one spur bevel pinion to the spur shaft comprising an axle structurally associated with the spur shaft, the at least one spur bevel pinion being rotatably mounted on the axle;
   means for selectively rotating the first spur bevel gear and the second spur bevel gear; and,
   transfer means for drivingly interconnecting the spur shaft and the second output shaft.

3. The power transmission device of claim 1, wherein the means for selectively rotating the first spur bevel gear and the second spur bevel gear compises:
   a first worm wheel structurally associated with the first spur bevel gear;
   a first worm in meshing engagement with the first worm wheel;
   a second worm wheel structurally associated with the second spur bevel gear; and,
   a second worm in meshing engagement with the second worm wheel.

4. The power transmission device of claim 3, wherein:
   the first worm wheel is coaxial with the first spur bevel gear; and,
   the second worm wheel is coaxial with the second spur bevel gear.

5. The power transmission device of claim 4, wherein:
   the first worm wheel is formed in the perimeter of the first spur bevel gear; and,
   the second worm wheel is formed in the perimeter of the second spur bevel gear.

6. The power transmission device of claim 5, wherein:
   the first worm is perpendicular to the axis of rotation of the first spur bevel gear; and,
   the second worm is perpendicular to the axis of rotation of the second spur bevel gear.

7. The power transmission device of claim 3, further comprising:
   first means for driving the first worm; and
   second means for driving the second worm.

8. A power transmission device comprising:
   a first output shaft;
   a second output shaft coaxial with the first output shaft;
   a first spur bevel gear concentrically located with the first output shaft and affixed to the first output shaft for rotation therewith;
   a spur shaft concentrically located over the second output shaft;
   a second spur bevel gear axially located with and spaced from the first spur bevel gear, the second spur bevel gear also being concentrically located with the spur shaft and journal mounted for rotation independently of the spur shaft;
   at least one spur bevel pinion located in the space between the first and second spur bevel gears and in meshing engagement with both the first and second spur bevel gear;
   means structually connecting the at least one spur bevel pinion to the spur shaft;
   means for selectively rotating the first spur bevel gear and the second spur bevel gear;
   a spur shaft driven gear coaxial with the spur shaft and affixed to the spur shaft for rotation therewith; and
   a drive gear coaxial with the second output shaft and affixed to the second output shaft for rotation therewith; and,
   a transfer gear train operatively interconnecting the spur shaft driven gear and the drive gear of the second output shaft.

9. The power transmission device of claim 8, wherein the transfer gear train comprises:
   a transfer shaft mounted for free rotation located in parallel, spaced apart relationship to the coaxis of the spur shaft and the second output shaft;
   a gear mounted on the transfer shaft for rotation therewith, and in meshing engagement with the drive gear on the second output shaft; and, an idler gear mounted on the transfer shaft for rotation therewith, and in meshing engagement with the spur shaft driven gear on the spur shaft.

10. The power transmission device of claim 9, wherein:
the gear mounted on the transfer shaft meshing with the drive gear on the second output shaft is sized to provide a step-up gear ratio of 2:1 from the spur shaft driven gear to the gear on the second output shaft such that the second output shaft will have an angular velocity twice that of the spur shaft.

11. The power transmission device of claim 1, wherein:
the first output shaft is hollow; and,
the second output shaft is coaxially received within the first output shaft.

12. The power transmission of claim 1, wherein:
the spur shaft is hollow and is coaxially located over the portion of the length of the second output shaft.

13. The power transmission device of claim 1, further comprising:
a housing enclosing the first spur bevel gear, the at least one spur bevel pinion, the means structurally connecting the at least one spur bevel pinion to the spur shaft, the transfer means, a portion of the first output shaft, and a portion of the second output shaft;
one end of the first output shaft provides outwardly of the housing; and,
one end of the second output shaft protrudes outwardly of the housing.

14. The power transmission device of claim 13, wherein:
the protruding end of the second output shaft extends beyond the protruding end of the first output shaft.

* * * * *